United States Patent [19]
Harrison et al.

[11] Patent Number: 5,571,614
[45] Date of Patent: Nov. 5, 1996

[54] POLYMERIC PACKAGING FILM COATED WITH A COMPOSITION COMPRISING A LAYER MINERAL AND A CROSSLINKED RESIN

[75] Inventors: Anthony G. Harrison, Middlesbrough; William N. E. Meredith, Stockton on Tees; David E. Higgins, Yorkshire, all of England

[73] Assignee: Imperial Chemical Industries PLC, London, England

[21] Appl. No.: 191,722

[22] Filed: Feb. 4, 1994

Related U.S. Application Data

[63] Continuation of Ser. No. 898,601, Jun. 15, 1992, abandoned.

[30] Foreign Application Priority Data

Jun. 14, 1991 [GB] United Kingdom ............... 9112827

[51] Int. Cl.⁶ ........................... B32B 5/16; B32B 27/30
[52] U.S. Cl. .................. 428/331; 428/446; 428/451; 428/501; 428/502; 428/519; 428/521; 428/522; 428/523; 428/524
[58] Field of Search ..................... 428/323, 331, 428/446, 451, 501, 502, 519, 521, 524, 522, 523

[56] References Cited

U.S. PATENT DOCUMENTS

| | | | |
|---|---|---|---|
| 3,499,820 | 3/1970 | Dessulmiers | 161/162 |
| 4,008,203 | 2/1977 | Jones | 260/49 |
| 4,130,687 | 12/1978 | Ballard et al. | 428/310 |
| 5,234,761 | 8/1993 | Barnes et al. | 428/336 |

FOREIGN PATENT DOCUMENTS

| | | | |
|---|---|---|---|
| 0001879 | 6/1979 | European Pat. Off. | C08G 65/40 |
| 0075396 | 6/1985 | European Pat. Off. | C09D 3/48 |
| 0087889 | 9/1985 | European Pat. Off. | C04B 26/12 |
| 0184458 | 6/1986 | European Pat. Off. | C08G 65/40 |
| 0235926 | 9/1987 | European Pat. Off. | B32B 19/00 |
| 0282212 | 9/1988 | European Pat. Off. | C09D 5/18 |
| 0463740 | 1/1992 | European Pat. Off. | C09D 1/02 |
| 838708 | 6/1960 | United Kingdom . | |
| 1585104 | 6/1960 | United Kingdom | C01B 33/26 |
| 1016385 | 1/1966 | United Kingdom . | |
| 1119305 | 7/1968 | United Kingdom | C01B 33/26 |
| 1134876 | 11/1968 | United Kingdom | B32B 27/06 |
| 1174328 | 12/1969 | United Kingdom | B32B 27/08 |
| 1540067 | 2/1979 | United Kingdom | G03C 1/80 |
| 1593382 | 7/1981 | United Kingdom | C01B 33/26 |

OTHER PUBLICATIONS

JP62073943 A 870404 DW8719, (6pp Dwg. No. 0/0) (Apr. 4, 1987).
JP3030944 A 910208 DW9112, (9pp Dwg. No. 0/0) Feb. 8, 1991).
JP Kokai: No. 62-181144 (Translation Only) (Aug. 8, 1987).
JP Kokai: No. 63-233836 (Translation Only) (Sep. 29, 1988).

Primary Examiner—Dhirajlal Nakarani
Attorney, Agent, or Firm—Cushman Darby & Cushman, LLP

[57] ABSTRACT

A polymeric film comprises a substrate layer of polymeric material and a coating layer formed from a composition comprising a layer mineral and a cross-linking agent. The coating layer comprises greater than 10% and less than 90% by weight of the layer of the layer mineral and greater than 10% and less than 90% by weight of the layer of a resin derived from the cross-linking agent. The coating layer preferably additionally comprises a copolymer of ethylene with a vinyl monomer. The polymeric film can have oxygen barrier properties, and the layer mineral coating layer exhibits improved adhesion to the polymeric substrate. The polymeric film is particularly suitable for use as a packaging film.

18 Claims, 1 Drawing Sheet

POLYMERIC PACKAGING FILM COATED WITH A COMPOSITION COMPRISING A LAYER MINERAL AND A CROSSLINKED RESIN

This is a continuation of application Ser. No. 07/896,601, filed on Jun. 15, 1992, which was abandoned upon the filing hereof.

This invention relates to a polymeric film, and in particular to a coated polymeric film.

Polymeric film comprising layer minerals are known. The layer minerals have been used to impart a variety of properties to polymeric films, such as flame retardancy, antistatic property and gas, particularly oxygen, barrier, as disclosed, for example in Japanese Unexamined Patent Application No 62-181144, EP-A-235926 and U.S. Pat. No. 3,499,820. Unfortunately the aforementioned films often suffer from inadequate adhesion of the layer mineral coating to the polymeric substrate.

Japanese Unexamined Patent Application No 63-233836 discloses a film having steam and gas barrier properties comprising a laminar silicate and a vinylidene chloride resin. However, there is presently a commercial requirement for more environmentally acceptable materials than vinylidene chloride resins.

SUMMARY OF THE INVENTION

We have now devised a coated film comprising a layer mineral which can exhibit oxygen barrier properties and improved adhesion of the layer mineral coating layer to the substrate.

Accordingly, the present invention provides a polymeric film comprising a substrate layer of polymeric material having on at least one surface thereof a coating layer formed from a composition comprising a layer mineral and a cross-linking agent, the coating layer comprising greater than 10% and less than 90% by weight of the layer of the layer mineral, and greater than 10% and less than 90% by weight of the layer of a resin derived from the cross-linking agent.

The invention also provides a method of producing a polymeric film by forming a substrate layer of polymeric material, and applying to at least one surface thereof a coating layer formed from a composition comprising a layer mineral and a cross-linking agent, the coating layer comprising greater than 10% and less than 90% by weight of the layer of the layer mineral, and greater than 10% and less than 90% by weight of the layer of a resin derived from the cross-linking agent.

A substrate for use in the production of a coated polymeric film according to the invention suitably comprises any polymeric material capable of forming a self-supporting opaque, or preferably transparent, film or sheet.

By a "self-supporting film or sheet" is meant a film or sheet capable of independent existence in the absence of a supporting base.

DESCRIPTION OF PREFERRED EMBODIMENTS

The substrate of a coated film according to the invention may be formed from any film-forming, polymeric material. Suitable thermoplastics, synthetic, materials include a homopolymer or a copolymer of a 1-olefine, such as ethylene, propylene or butene-1, especially polypropylene, a polyamide, a polycarbonate, and particularly a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7- naphthalenedicarboxylic acid, succinic acid, sebacic acid, adipic acid, azelaic acid, 4,4'- diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example —as described in British patent 838,708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAR. The substrate may comprise a poly(arylene sulphide), particularly poly-p-phenylene sulphide or copolymers thereof. Blends of the aforementioned polymers may also be employed.

Suitable thermoset resin substrate materials include addition—polymerization resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The polymeric film substrate for production of a coated film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilised by heat-setting under dimensional restraint at a temperature above the glass transition temperature thereof.

The substrate is suitably of a thickness from 6 to 300, particularly from 6 to 100, and especially from 6 to 25 μm.

By "cross-linking" agent is meant a material which reacts chemically to form a polymeric resin during formation of the coating layer, preferably forming covalent bonds, both with itself and with the surface of the underlying layer to form cross-links thereby improving adhesion thereto. The cross-linking agent is suitably an organic material, preferably a monomeric and/or oligomeric species, and particularly monomeric, prior to formation of the coating layer. The molecular weight of the cross-linking agent is preferably less than 5000, more preferably less than 2000, especially less than 1000, and particularly in the range from 250 to 500. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, aziridines, alkyl melamines, aryl melamines, benzo guanamines, guanamines, alkyl guanamines and aryl guanamines, with an aldehyde, eg formaldehyde. A preferred cross-linking agent is the condensation product of melamine with formaldehyde. The condensation product may optionally be alkoxylated. A catalyst is also preferably employed to facilitate cross-linking action of the cross-linking agent. Preferred catalysts for cross-linking melamine formaldehyde include para toluene sulphonic acid, maleic acid stabilised by reaction with a base, and morpholinium paratoluene sulphonate.

The layer mineral preferably comprises platelets of a film-forming, 2:1 phyllosilicate layer mineral. For information on the composition and structure of phyllosilicate layer minerals, reference can be made to "Clay Minerals: Their Structure, Behaviour & Use", Proceedings of a Royal Society Discussion Meeting, 9 & 10 Nov. 1983, London, The Royal Society, 1984 (particularly pages 222–223, 232–235).

The term "platelets" as used in this specification means tiny particles of the layer mineral obtained by subjecting the mineral to a chemical delaminating process to form an aqueous colloidal dispersion of high aspect ratio particles of the mineral from which a film can be formed.

Preferably, the layer mineral is selected from the group consisting of smectites, preferably hectorite and montmorillonite, and particularly vermiculite.

The term "vermiculite" as used in this specification means all materials known mineralogically and commercially as vermiculite. Vermiculite ore being a naturally-occuring mineral contains a mixture of phases (eg vermiculite, biotite, hydrobiotite etc) and a mixture of interlayer cations (eg $Mg^{2+}$, $Ca^{2+}$, $K^+$). Production of aqueous suspensions or slurries of vermiculite platelets rely on ion exchange (normally incomplete) to generate adequate macroscopic swelling. The swollen, fully-or partially-exchanged vermiculite gel can then be milled to produce a film-forming aqueous suspension of vermiculite platelets. Treatment of vermiculite particles with one or more aqueous solutions of metal (especially alkali metal) salts or alkyl ammonium salts followed by swelling in water and then milling to delaminate the vermiculite is well known and is described for example in GB-A-1016385, GB-A-1119305, GB-A-1585104 and GB-A-1593382, and in U.S. Pat. No. 4,130,687.

Vermiculite is a particularly suitable layer mineral when a coated film exhibiting gas barrier, especially oxygen barrier, is required. A coated film according to the invention suitably has an oxygen permeability of less than 50, preferably less than 20, more preferably less than 10, particularly less than 5, and especially less than 1 cc/m²/day.

A preferred embodiment of the invention comprises a coating layer of vermiculite platelets wherein greater than 50%, preferably 55 to 99.9%, more preferably 60 to 99%, and particularly 70 to 95% by number of the platelets have a particle size (by which is meant the size of the maximum width of a platelet) in the range 0.5 to 5.0 μm. It is also preferred that 80 to 99.9%, more preferably 85 to 99.9%, and especially 90 to 99.9% by number of the vermiculite platelets have a particle size in the range 0.1 to 5.0 μm. The mean particle size (by which is meant the mean value of the maximum width of the platelets) of vermiculite platelets is preferably 1.0 to 3.0 μm, more preferably 1.2 to 2.2 μm, and especially 1.3 to 1.6 μm. It is also preferred that the vermiculite platelets have a thickness in the range from approximately 10 to 60 A, especially from approximately 25 to 40 A. In addition, it is preferred that from 60 to 100%, more preferably from 70 to 99%, and particularly from 90 to 95% by number of vermiculite platelets have a thickness in the range 10 to 60 A. The mean thickness of vermiculite platelets is preferably 25 to 50 A, more preferably 25 to 40 A, and especially 25 to 30 A.

Although the coating layer can comprise a substantially continuous layer of platelets of any practical thickness, suitably up to 5 μm, preferably up to 2 μm, and more preferably up to 0.2 μm, coated films exhibiting desired properties, for example surprisingly improved barrier property against atmospheric oxygen, comprise a substantially continuous layer of platelets at very low thicknesses, eg as low as 0.01 μm, especially in the range from 0.02 μm to 0.2 μm, and particularly in the range from 0.025 μm to 0.1 μm.

The coating layer preferably comprises greater than 20% and less than 80%, more preferably greater than 25% and less than 70%, particularly greater than 30% and less than 60%, and especially greater than 30% and less than 50% by weight of the layer of the resin derived by cross-linking the cross-linking agent. The coating layer preferably comprises greater than 20% and less than 80%, more preferably greater than 30% and less than 75%, particularly greater than 40% and less than 70%, and especially greater than 50% and less than 70% by weight of the layer of the layer mineral.

In a preferred embodiment of the invention the coating layer additionally comprises a copolymer of a 1-olefine with a vinyl monomer. Suitable 1-olefines include ethylene, propylene and butene-1. Ethylene is particularly preferred. The vinyl monomer is preferably a vinyl ester, such as vinyl chloroacetate, vinyl benzoate, and particularly vinyl acetate. An ethylene/vinyl acetate copolymer is especially preferred. The ratio of the amount of 1-olefine to vinyl monomer present in the copolymer is preferably in the range from 5:1 to 1:5, more preferably 4:1 to 1:2, and especially 3:1 to 1:1. The presence of the copolymer of a 1-olefine with a vinyl monomer in the coating layer surprisingly further increases the strength of adhesion of the layer mineral coating layer to the polymeric substrate. The amount of the copolymer of a 1-olefine with a vinyl monomer is preferably present in the coating layer within the range from 1% to 30%, more preferably from 2% to 20%, particularly from 2.5% to 15%, and especially from 2.5% to 4% by weight of the layer. The copolymer of a 1-olefine with a vinyl monomer is preferably mixed with the layer mineral, prior to adding the cross-linking agent to the coating composition.

The coating layer is formed by applying the coating composition, comprising the layer mineral platelets, cross-linking agent and preferably the copolymer of a 1-olefine with a vinyl monomer, as a slurry or dispersion and removing the dispersion medium to form a coherent layer. Preferably, the dispersion medium comprises water and the slurry or dispersion comprises between 0.5% and 20%, more especially between 1% and 10%, by weight of the layer mineral platelets.

The coating layer composition my be applied before, during or after the stretching operation in the production of an oriented film. The coating layer composition may, for example, be applied to the film substrate between the two stages (longitudinal and transverse) of a thermoplastics film biaxial stretching operation. Such a sequence of stretching and coating may be suitable for the production of a coated linear polyester film substrate, which is preferably firstly stretched in the longitudinal direction over a series of rotating rollers, coated, and then stretched transversely in a stenter oven, preferably followed by heat setting. The coating composition is preferably applied to an already oriented film substrate, such as a biaxially oriented polyester, particularly polyethylene terephthalate film, which is preferably subjected to heating.

The temperature to which the coated film is heated depends, inter alia on the composition of the polymeric substrate. A coated polyester, especially polyethylene terephthalate, substrate is suitably heated from 100° C. to 240° C., preferably from 160° C. to 220° C., in order to dry the aqueous medium, or the solvent in the case of solvent-applied compositions, and for cross-linking of the layer to occur and also to assist in coalescing and forming the coating into a continuous and uniform layer. In contrast, a coated polyolefin, especially polypropylene, is suitably heated in the range 85° C. to 95° C.

The coating layer composition is preferably applied to the polymeric film substrate by any suitable conventional technique such as dip coating, bead coating, reverse roller coating or slot coating.

The coating layer is preferably applied to the polymeric substrate at a coat weight within the range 0.25 to 100 mgdm$^{-2}$, more preferably 0.5 to 40 mgdm$^{-2}$, especially 1.0 to 20.0 mgdm$^{-2}$. For films coated on both surfaces, each layer preferably has a coat weight within the preferred range.

In a preferred embodiment of the invention, an additional primer layer is applied to the substrate layer prior to coating with the layer mineral coating layer. The presence of the primer layer in polymeric films according to the invention results in a surprising improvement in oxygen barrier properties.

The primer layer comprises at least one polymeric resin which may be any polymer known in the art to be capable of forming a continuous, preferably uniform, coating, being adherent to the supporting substrate, and preferably exhibiting optical clarity.

Suitable polymeric resins include:

(a) "aminoplast" resins which can be prepared by the interaction of an amine or amide with an aldehyde, typically an alkoxylated condensation product of melamine and formaldehyde, eg hexamethoxymethylmelamine, trimethoxy trimethylol melamine formaldehyde;

(b) homopolyesters, such as polyethylene terephthlate;

(c) copolyesters, particularly those derived from a sulpho derivative of a dicarboxylic acid such as sulphoterephthalic acid and/or sulphoisophthalic acid;

(d) copolymers of styrene with one or more ethylenically unsaturated comonomers such as maleic anhydride or itaconic acid, especially the copolymers described in GB-A-1540067;

(e) copolymers of acrylic acid and/or methacrylic acid and/or their lower alkyl (up to 6 carbon atoms) esters, eg copolymers of ethyl acrylate and methyl methacrylate, copolymers of methyl methacrylate/butyl acrylate/acrylic acid typically in the molar proportions 55/27/18% and 36/24/40%;

(f) copolymers of styrene/acrylamide, particularly of the type described in GB-A-1174328 and GB-A-1134876;

(g) functionalised polyolefins, especially maleinised polybutadiene;

(h) cellulosic materials such as nitrocellulose, ethylcellulose and hydroxyethylcellulose; and (i) polyvinyl alcohol.

A preferred polymeric resin component of the primer layer comprises a copolymer comprising acrylamide and/or a derivative thereof, such as a lower alkoxy, preferably n-butoxy, and/or methacrylamide and/or a derivative thereof, such as a lower alkoxy, preferably n-butoxy, and at least one other ethylenically unsaturated comonomer copolymerisable therewith, including acrylic acid and its esters, including alkyl esters, for example methyl acrylate, ethyl acrylate, butyl acrylate, 2-ethyl-hexyl acrylate, isobutyl acrylates, hexyl acrylates and octyl acrylates; methacrylic acid and its esters for example methyl methacrylate, ethyl methacrylate and butyl methacrylate. Other suitable monomers include acrylonitrile, styrene, monomethyl styrene, vinyl toluene, maleic anhydride, and vinyl ethers. Styrene and alkyl acrylates are particularly preferred monomers. Dienes such as butadiene or chloroprene may also be present in the primer layer copolymer.

The primer layer copolymer preferably comprises at least one free functional acid (for example a pendant carboxyl or sulphonate group) group, that is a group other than those involved in the polymerisation reaction by which the copolymer is formed, such as acrylic acid, methacrylic acid, maleic acid and itaconic acid. Suitably up to 25%, preferably up to 10%, and especially up to 5% by weight of comonomer containing a free functional acid group may be employed.

The polymeric resin component of the primer layer preferably comprises a copolymer derived from up to 90% by weight of styrene, up to 80% by weight of an alkyl acrylate, up to by weight of methacrylic acid, and from 5% to 40% by weight of acrylamide which has been condensed with a solution of formaldehyde in n-butanol containing from 0.2 to 3 equivalents of formaldehyde for each amide group in the copolymer. A particularly preferred copolymer comprises styrene/2-ethyl hexyl acrylate/methacrylic acid/n-butoxymethyl acrylamide in a ratio of 20 to 40/30 to 50/1 to 5/20 to 35% by weight. GB-A-1174328 and GB-A-1134876 describe suitable methods for the synthesis of the aforementioned primer layer copolymers.

The polymeric resin of the primer layer is preferably compatible with, and includes, an additional acidic component, such as sulphuric, nitric, acetic acid or any mineral acid, such as hydrochloric acid, in the primer layer coating composition. The additional acidic component is preferably present in the primer layer coating composition in a concentration range from 0.5 to 15, more preferably 1 to 10, and especially 4 to 8% by weight relative to the polymeric resin. Sulphuric acid is a preferred acidic component.

The molecular weight of polymeric resin of the primer layer can vary over a wide range but the weight average molecular weight is preferably within the range 10,000 to 300,000, and more preferably within the range 15,000 to 100,000.

The polymer(s) of the primer layer coating composition is generally water-insoluble. The primer layer composition including the water-insoluble polymer may nevertheless be applied to the polymeric film substrate as an aqueous dispersion or alternatively as a solution in an organic solvent.

The primer layer coating medium my be applied before, during or after the stretching operation. In particular, the coating medium my be applied to the film substrate between the two stages (longitudinal and transverse) of a biaxial stretching operation. Such a sequence of stretching and coating is suitable for the production of a coated linear polyester film substrate, such as a coated polyethylene terephthalate film, which is preferably firstly stretched in the longitudinal direction over a series of rotating rollers, coated, and then stretched transversely in a stenter oven, preferably followed by heat setting.

The primer layer coating composition my be applied to the polymeric film as an aqueous dispersion or solution in an organic solvent by any suitable conventional coating technique such as dip coating, bead coating, reverse roller coating or slot coating.

The primer layer coating medium is preferably applied to an already oriented film substrate, such as a biaxially oriented polyester, particularly polyethylene terephthalate film.

Prior to deposition of the primer layer or coating layer onto the polymeric substrate, the exposed surface thereof may, if desired, be subjected to a chemical or physical surface-modifying treatment to improve the bond between that surface and the subsequently applied primer or coating layer. A preferred treatment, because of its simplicity and effectiveness, which is particularly suitable for the treatment of a polyolefin substrate, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent eg a solution of p-chloro-m-cresol, 2,4-dichlorophenol, 2,4,5- or 2,4,6-trichlorophenol or 4-chlororesorcinol in acetone or methanol.

The primer layer is preferably applied to the polymeric substrate at a coat weight within the range 0.1 to 10 mgdm$^{-2}$, especially 1.0 to 6 mgdm$^{-2}$. For films coated on both surfaces, each layer preferably has a coat weight within the preferred range.

Modification of the surface of the primer layer, eg by flame treatment, ion bombardment, electron beam treatment, ultra-violet light treatment or preferably by corona discharge, may improve the adhesion of the subsequently applied coating layer comprising a layer mineral, but may not be essential to the provision of satisfactory adhesion.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface.

The ratio of substrate to primer layer thickness may vary within a wide range, although the thickness of the primer layer preferably should not be less than 0.004% nor greater than 10% of that of the substrate. In practice, the thickness of the primer layer is desirably at least 0.005 μm and preferably should not greatly exceed about 1.0 μm.

An additional overcoat layer may be applied to the coating layer. The overcoat layer may comprise any suitable film-forming polymeric resin, such as those described herein for use in the primer layer.

Polymeric films as described herein are suitable for use as a packaging film, particularly when laminated with a polyethylene film as an overcoat layer. The polyethylene film is preferably adhered to the coating layer of a polymeric film by means of an intermediate adhesive, particularly polyurethane, layer.

One or more of the layers of a polymeric film according to the invention, ie substrate, primer, coating and/or overcoat layer(s), may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the substrate and/or coating layer(s), as appropriate. In particular, a substrate may comprise a particulate filler, such as silica, of small particle size. Desirably, a filler, if employed in a substrate layer, should be present in a small amount, not exceeding 0.5%, preferably less than 0.2%, by weight of the substrate.

BRIEF DESCRIPTION OF THE DRAWINGS

The invention is illustrated by reference to the accompanying drawings in which:

Referring to FIG. 1 of the drawings, the film comprises a polymeric substrate layer (1) having a coating layer (2) bonded to one surface (3) thereof.

Figure 1:
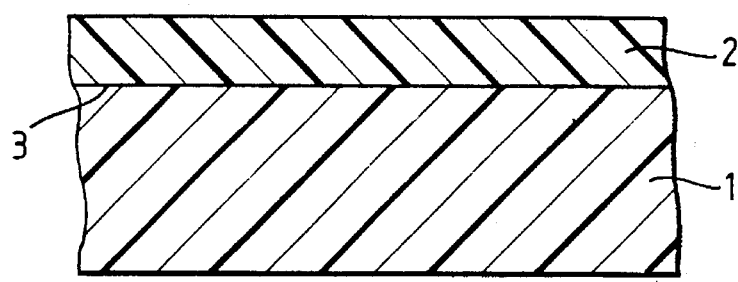
FIG. 1 is a schematic sectional elevation, not to scale, of a coated film having a substrate and coating layers.
Figure 2:
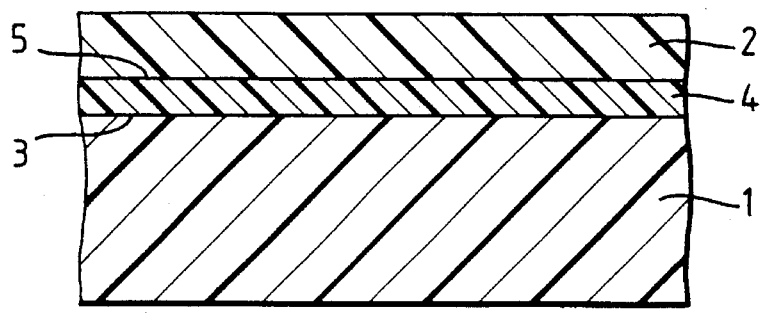
FIG. 2 is a similar schematic elevation of a coated film with an additional primer layer in between the substrate and coating layer.

The film of FIG. 2 further comprises an additional primer layer (4), bonded to the surface (3) of the substrate (1) and the surface (5) of the coating layer (2).

Figure 3:
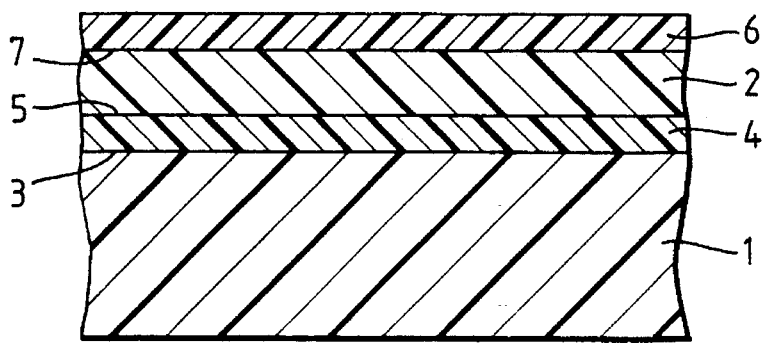
FIG. 3 is a similar schematic elevation of a film as shown in FIG. 2, with an additional overcoat layer on the remote surface of the coating layer.

The film of FIG. 3 further comprises an additional overcoat layer (6), bonded to the remote surface (7) of the coating layer (2).

EXAMPLES

The invention is further illustrated by reference to the following examples.

The following test procedures were used.

Adhesion Test

The adhesion of the coating layer to the substrate, or of the coating layer to the primer layer and the primer layer to the substrate was measured using the following method. Two strips of adhesive tape were attached to the coating layer of a film by rubbing up and down three times on the back of the tape. The first strip of adhesive tape was slowly peeled back at 180° to the peel edge (=slow pull). The second strip of adhesive tape was removed by pulling rapidly directly from the film surface (=fast pull). The film sample was then viewed over a light box and the amount of coating removed was assessed as good (=no visible coating damage), fair (=some coating damaged), and poor (=majority of coating removed).

Oxygen Barrier

Oxygen permeability of a film was measured using a Mocon 1050 (Modern Controls Inc.) test instrument. A film sample was placed in the machine with the nitrogen carrier gas flowing both above and below the film, in order that a background reading can be obtained. The nitrogen above the film was replaced by oxygen, and the amount of oxygen able to permeate through the film was measured in a carrier gas by using a sensor.

Example 1

A vermiculite suspension was prepared in accordance with the following method:

100 g of vermiculite ore (ex-Carolina, US) was refluxed with 1 liter of 1 N lithium citrate solution at 80° C. for four hours and left at room temperature for five days. This resulted in the exchange of 45.3 mEq/100 g of lithium cations in the ore. The ion-exchanged vermiculite ore was washed 5 times with deionised water to remove the excess salts and left overnight to swell in a large volume (ie 10 times the volume of vermiculite) of deionised water. The swollen vermiculite was milled for 40 minutes in a Greaves high-shear mixer at 7200 rpm to produce a suspension of vermiculite platelets. The platelet suspension was then sieved by passing through a mechanically agitated filter having a pore size of 106 µm.

A polyethylene terephthalate film was melt extruded, cast onto a cooled rotating drum and stretched in the direction of extrusion to approximately 3 times its original dimensions. The film was passed into a stenter oven, where the film was stretched in the sideways direction to approximately 3 times its original dimensions. The biaxially stretched film was heat set at a temperature of about 220° C. by conventional means. Final film thickness was 23 µm.

The biaxially oriented polyethylene terephthalate film was coated on one side using a gravure coater, with a coating layer composition comprising the following ingredients:

| | |
|---|---|
| Vermiculite (7.5% w/w aqueous dispersion) | 16 l |
| Cymel 385 (melamine formaldehyde of molecular weight 348) | 800 ml |
| Para toluene sulphonic acid (10% w/w aqueous solution) | 100 ml |
| Synperonic NP 10 (10% w/w aqueous solution of a nonyl phenol ethoxylate, supplied by ICI) | 150 ml |
| Demineralised water | to 20 liters |

The coated film was dried at 180° C., and the dry coat weight of the coating layer was approximately 2 mgdm$^{-2}$. The thickness of the coating layer was approximately 0.1 µm.

The adhesion of the coating layer to the substrate was measured using the adhesion test described above and scored "good" for both the slow and fast pull.

The oxygen barrier property was determined for the coated film by measuring the oxygen permeability which was 9.5 cc/m$^2$/day. The oxygen permeability of uncoated polyethylene terephthalate film was also measured and found to be 50.0 cc/m$^2$/day.

Example 2

The procedure of Example 1 was repeated except that the biaxially oriented polyethylene terephthalate film was first coated on one side with a primer layer medium. The primer layer medium stock solution contains 50% by weight of a polymer comprising styrshe/ethyl hexyl acrylate/methacrylic acid/n-butoxymethyl acrylamide in a weight % ratio of 30.9/38.9/2.1/28.1, in a 19/78/3 by weight % solvent mixture of n-butanol/toluene/xylene. Prior to coating, the primer layer medium stock solution was diluted to 4% by weight with isopropyl alcohol, and 6% by weight of the polymer, of sulphuric acid was added. The primer layer medium was coated using a gravure coater. After coating, the film was dried in a hot air oven maintained at 90° C. to yield a film having a primer layer dry coat weight of 1.0 mgdm$^{-2}$ and thickness of approximately 0.1 µm.

The primer layer coated polyethylene terephthalate film was then coated on top of the primer layer with the coating layer composition as described in Example 1.

The adhesion of the coating layer to the primer layer and the primer layer to the substrate was measured using the adhesion test described above and scored "good" for both the slow and fast pull.

The oxygen barrier property of the film was determined by measuring the oxygen permeability which was 0.5 cc/m$^2$/day.

Example 3

This is a comparative example not according to the invention. The procedure of Example 2 was repeated except that the coating layer composition did not contain any Cymel 385 or para toluene sulphonic acid.

The adhesion of the coating layer to the primer layer and the primer layer to the substrate was measured using the adhesion test described above and scored "poor" for both the slow and fast pull.

Example 4

The procedure of Example 1 was repeated except that the coating layer composition comprised the following ingredients:

| | |
|---|---|
| HTS-SE (8.3% w/w aqueous dispersion of vermiculite containing 5% by weight relative to the vermiculite of ethylene/vinyl acetate copolymer (by Applicant's analysis), supplied by W R Grace, Massachusetts) | 8 l |
| Cymel 385 (melamine formaldehyde of molecular weight 348) | 450 ml |
| Para toluene sulphonic acid (10% w/w aqueous solution) | 180 ml |
| Synperonic NP 10 (10% w/w aqueous solution of a nonyl phenol ethoxylate, supplied by ICI) | 200 ml |
| Demineralised water | to 20 liters |

The adhesion of the coating layer to the substrate was measured using the adhesion test described above and scored "good" for both the slow and fast pull.

The strength of adhesion of the coating layer to the substrate was further measured by an additional test whereby the coating layer was coated using a gravure system with a polyurethane adhesive (prepared by mixing a polyurethane prepolymer (Product No 10-2525/3) and a polyhydric alcohol (Product No 10-2526/3, both obtained from Holden Surface Coatings Ltd, England)), dried in an oven at 80° C. and laminated with a polyethylene film by passing the two films through a nip heated at 120° C. The adhesion was measured by peeling apart the resulting laminate using an "Instron" Tensometer at a peel speed of 200 mm min$^{-1}$. The peel strength was 250 g/25 mm (98 Nm$^{-1}$). In comparison, a laminate formed using a coated film produced in Example 1 had a peel strength of 10 g/25 mm (3.9 Nm$^{-1}$).

The above examples illustrate the improved properties of coated films of the present invention.

We claim:

1. In a polymeric packaging film comprising a substrate layer of polymeric material having on at least one surface thereof a coating layer to reduce oxygen permeability, the improvement which comprises using as the coating layer, one formed from a composition comprising a layer mineral and a monomeric or oligomeric cross-linking agent, the coating layer comprising greater than 10% and less than 90% by weight of the layer of the layer mineral, and greater than 10% and less than 90% by weight of the layer of a resin formed in situ by said cross-linking agent during formation of said coating layer, said coating layer functioning to adhere the layer mineral to the substrate and provide the film with an oxygen permeability of less than 50 cc/m$^2$/day.

2. A polymeric film according to claim 1 wherein the coating layer comprises greater than 20% and less than 80% by weight of the layer of the layer mineral, and greater than 20% and less than 80% by weight of the layer of the resin derived from the cross-linking agent.

3. A polymeric film according to claim 1 wherein the coating layer additionally comprises a copolymer of a 1-olefine with a vinyl monomer.

4. A polymeric film according to claim 1 wherein the cross-linking agent has a molecular weight less than 2000.

5. A polymeric film according to claim 1 wherein the layer mineral comprises platelets of a film-forming, 2:1 phyllosilicate.

6. A polymeric film according to claim 5 wherein the 2:1 phyllosilicate comprises vermiculite.

7. A polymeric film according to claim 1 wherein a primer layer comprising a polymeric resin is present in between the substrate and coating layer.

8. A polymeric film according to claim 7 wherein the primer layer is acidic.

9. A polymeric film according to claim 7 wherein the primer layer comprises a copolymer comprising a member of the group consisting of acrylamide and methacrylamide, and at least one other ethylenically unsaturated comonomer copolymerisable therewith.

10. A polymeric film according to claim 1 wherein the resin is produced in situ by the crosslinking agent, during formation of the coating layer, such that the resin is crosslinked with itself and with the substrate layer.

11. A polymeric film according to claim 10 wherein the layer mineral is vermiculite, the crosslinking agent is a condensation product of melamine and formaldehyde and the coating layer also includes a copolymer of a 1-olefine with a vinyl monomer.

12. A polymeric packaging film according to claim 1 which includes a polyethylene film as a coating over the coating layer.

13. A polymeric packaging film according to claim 1 wherein the substrate layer is a biaxially oriented polyethylene terephthalate film, the thickness of said substrate layer is from 6 to 100 μm, and the layer mineral is vermiculite platelets wherein 70–95% of the platelets have a particle size in the range of 0.5 to 5.0 μm; and the mean particle size of the platelets is 1.3 to 1.6 μm.

14. A film according to claim 1 wherein the coating layer comprises greater than 30% and less than 50% by weight of the resin and greater than 50% and less than 70% by weight of layer mineral, all based on the weight of the layer.

15. A polymeric packaging film comprising a substrate layer of polymeric material having on at least one surface thereof a coating layer to reduce oxygen permeability, said coating layer being formed from a composition comprising a layer mineral and a monomeric or digomeric cross-linking agent, the coating layer comprising greater than 10% and less than 90% by weight of the layer of the layer mineral, and greater than 10% and less than 90% by weight of the layer of a resin derived from the cross-linking agent, the resin being produced in situ by the crosslinking agent, such that the resin is crosslinked with itself and with the substrate, wherein the layer mineral is vermiculite, the crosslinking agent is a condensation product of melamine and formaldehyde and the coating layer includes a copolymer which is an ethylene-vinyl acetate copolymer.

16. A polymeric film comprising a substrate layer of polymeric material having on at least one surface thereof a coating layer to reduce oxygen permeability, said coating layer being formed from a composition comprising a layer mineral and a cross-linking agent, the coating layer comprising greater than 10% and less than 90% by weight of the layer of the layer mineral, and greater than 10% and less than 90% by weight of the layer of a resin derived from the cross-linking agent, said substrate layer including a polymeric primer between the substrate layer and the coating layer, the resin derived from said crosslinking agent being produced in situ by the crosslinking agent during formation of said coating layer, so that the resin is crosslinked with itself and with the primed substrate, the layer mineral being vermiculite, the crosslinking agent being a condensation product of melamine and formaldehyde and the coating layer including a copolymer which is an ethylene-vinyl acetate copolymer.

17. A polymeric film according to claim 16 wherein the coating layer comprises greater than 30% and less than 50% by weight of the resin formed by said crosslinking agent.

18. In a polymeric packaging film comprising a substrate layer of polymeric material having on at least one surface thereof a coating layer to reduce oxygen permeability, the improvement which comprises using as the coating later, a composition comprising a layer mineral and a crosslinking agent, the coating layer comprising greater than 10% and less than 90% by weight of the layer of the layer mineral, and greater than 10% and less than 90% by weight of the layer of a resin produced, during formation of the coating layer, by reaction of a monomeric and/or oligomeric crosslinking agent.

\* \* \* \* \*